United States Patent [19]

Yanik

[11] Patent Number: 4,606,383
[45] Date of Patent: Aug. 19, 1986

[54] BATTERY GRID PASTING MACHINE

[75] Inventor: David Yanik, Port Huron, Mich.

[73] Assignee: Wirtz Manufacturing Company, Inc., Port Huron, Mich.

[21] Appl. No.: 753,184

[22] Filed: Jul. 9, 1985

Related U.S. Application Data

[63] Continuation of Ser. No. 568,213, Dec. 15, 1983, abandoned.

[51] Int. Cl.⁴ .............................................. H01M 4/20
[52] U.S. Cl. ........................................ 141/32; 141/1.1; 141/89; 29/2; 29/623.1
[58] Field of Search ..................... 141/1.1, 32, 33, 85, 141/89, 91, 392, 129, 168; 29/2, 623.1, 623.5

[56] References Cited

U.S. PATENT DOCUMENTS

| | | | |
|---|---|---|---|
| 1,863,175 | 6/1932 | Watkins | 141/32 |
| 2,081,944 | 6/1937 | Lund | 141/32 |
| 2,175,943 | 10/1939 | Lohrman | 141/32 |
| 2,212,070 | 8/1940 | Luhrman | 141/32 |
| 2,215,438 | 9/1940 | Radle | 141/32 |
| 2,375,424 | 5/1945 | Lund | 141/32 |
| 2,382,367 | 8/1945 | Donath | 141/32 |
| 2,385,277 | 9/1945 | Hatfield | 141/32 |
| 2,555,301 | 6/1951 | Chubb | 141/1.1 |
| 2,669,376 | 2/1954 | Winkel | 141/32 |
| 2,680,547 | 6/1954 | Donath | 141/32 |
| 2,832,126 | 4/1958 | Galloway | 29/76 A |
| 2,840,120 | 6/1958 | Lund | 141/32 |
| 2,949,940 | 8/1960 | Lozo | 141/32 |
| 3,432,351 | 3/1969 | Davee et al. | 141/1.1 X |
| 3,951,688 | 4/1976 | Pankow et al. | 141/1.1 |
| 4,318,430 | 3/1982 | Perman | 141/32 |

FOREIGN PATENT DOCUMENTS 2151392  7/1985  United Kingdom ................. 141/32

Primary Examiner—Stephen Marcus
Assistant Examiner—Ernest G. Cusick
Attorney, Agent, or Firm—Barnes, Kisselle, Raisch, Choate, Whittemore & Hulbert

[57] ABSTRACT

A battery grid pasting machine has an endless steel conveyor belt for advancing grids beneath a paste hopper. The lower end of the hopper is closed by an orifice plate. The top run of the belt is supported by a vertically adjustable roller directly beneath an orifice slot in the orifice plate. A guide assembly is provided for advancing the grids in a downwardly inclined position toward the underside of the hopper. The hopper and the belt conveyor assembly are supported from one side of the machine in cantilever fashion which enables the hopper and the endless belt to be removed and replaced with a minimum dismantling of components of the machine.

35 Claims, 17 Drawing Figures

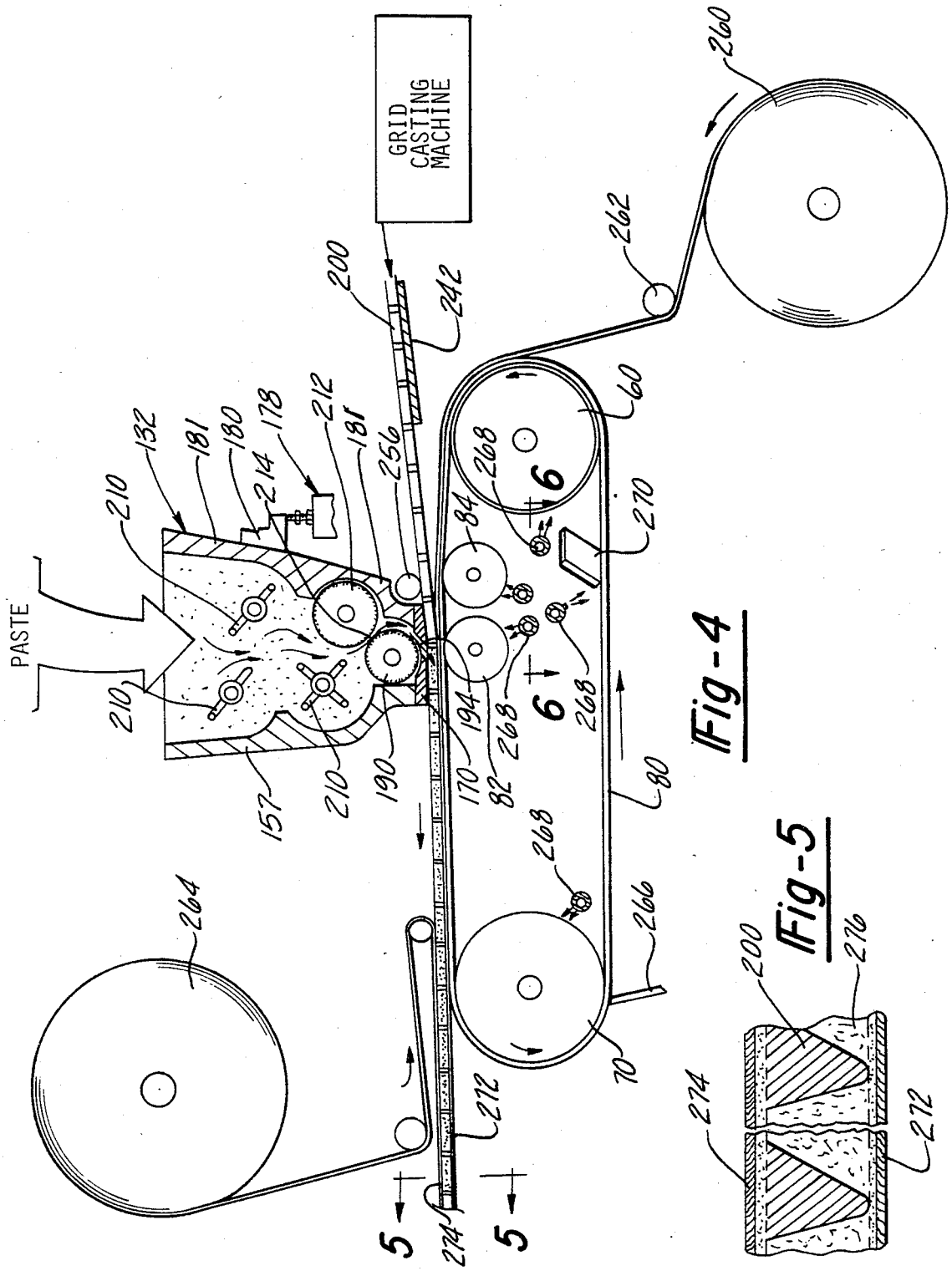

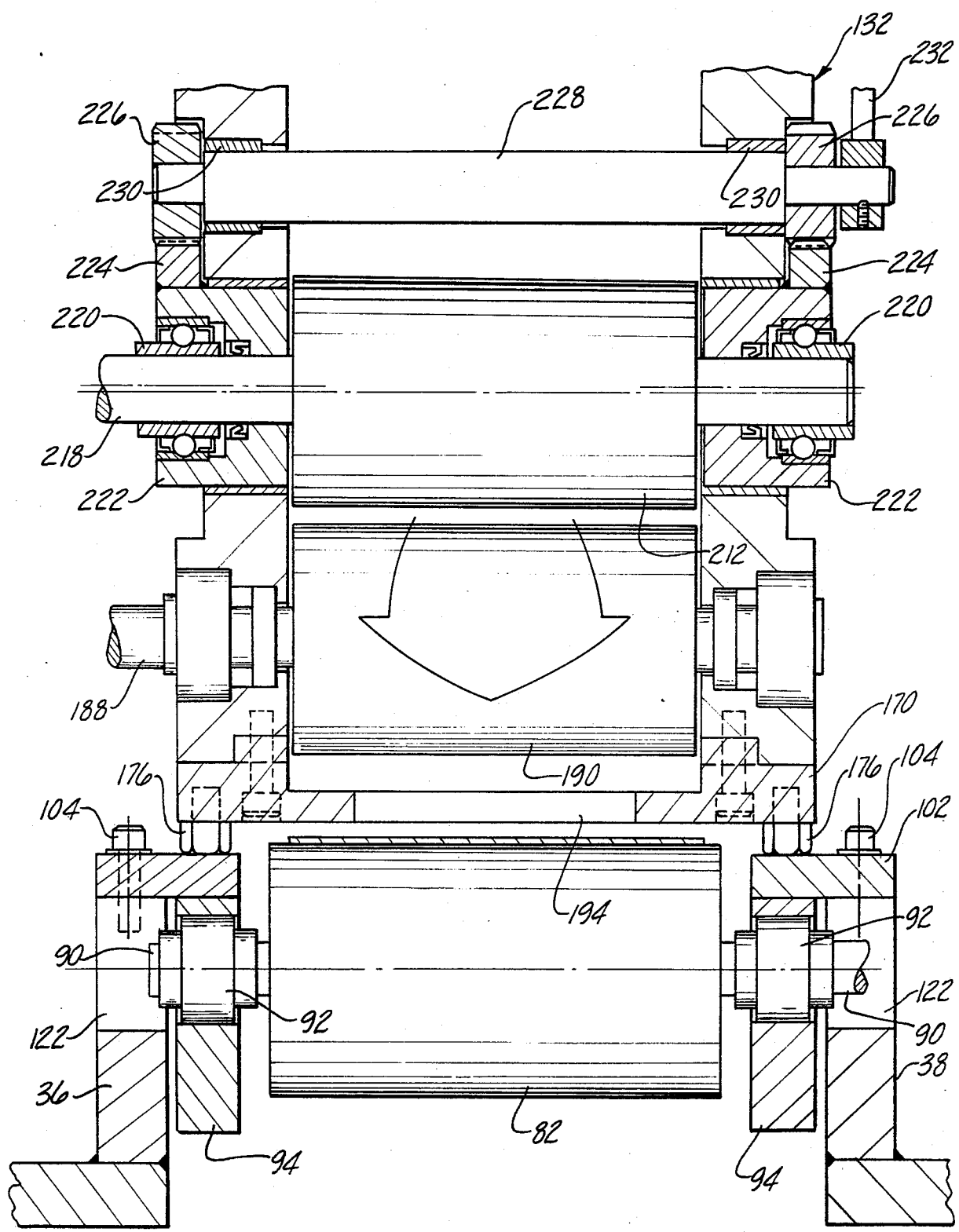

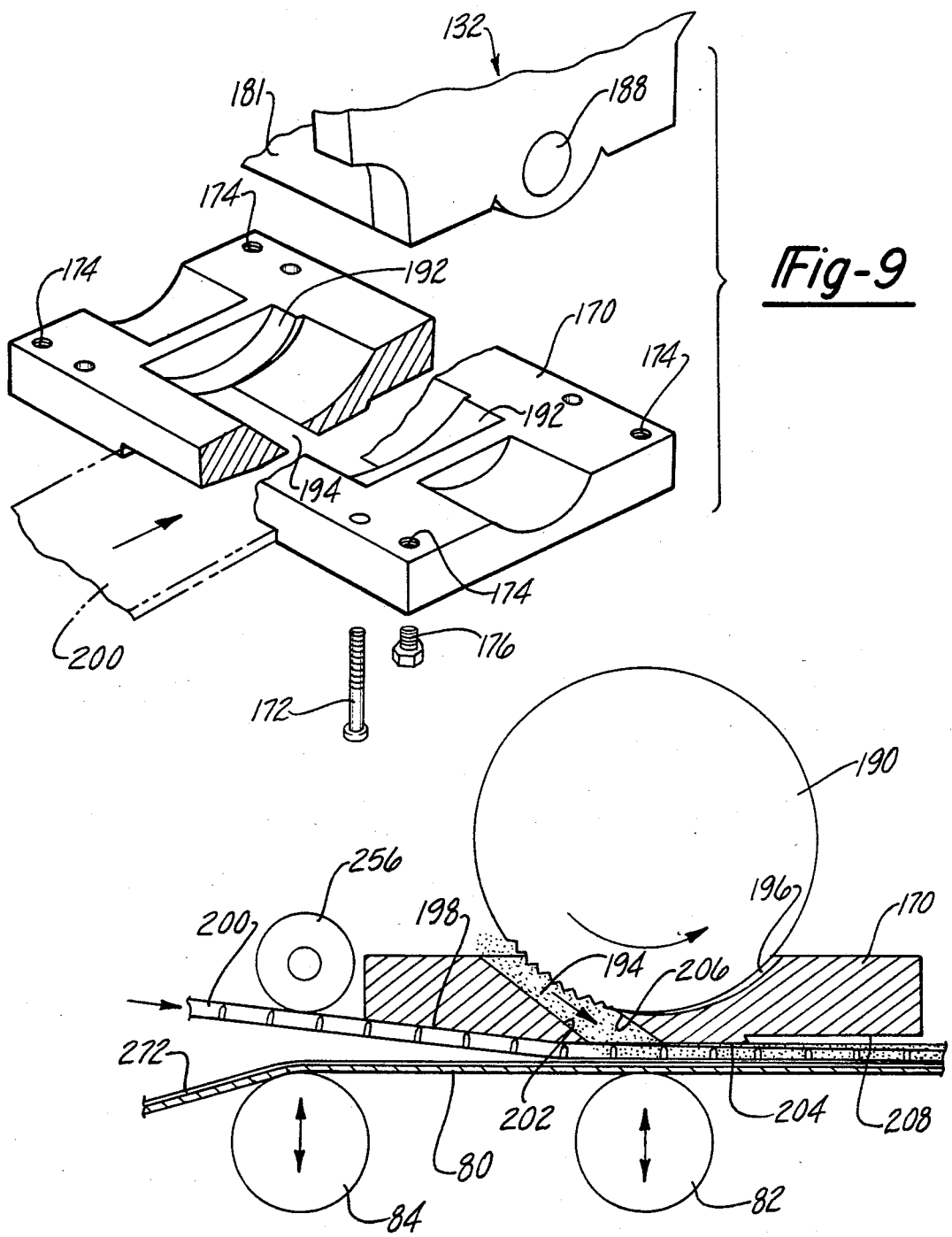

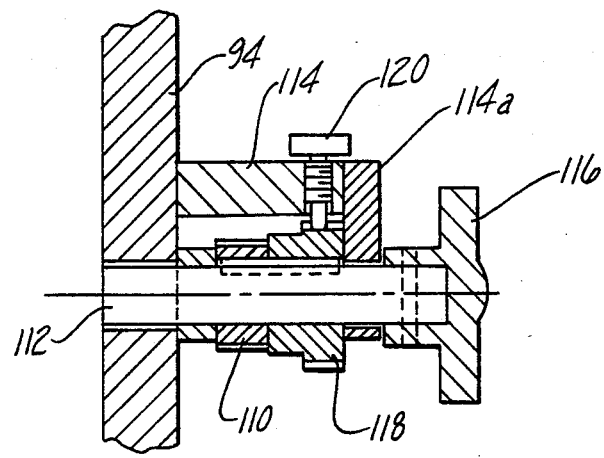
Fig-13
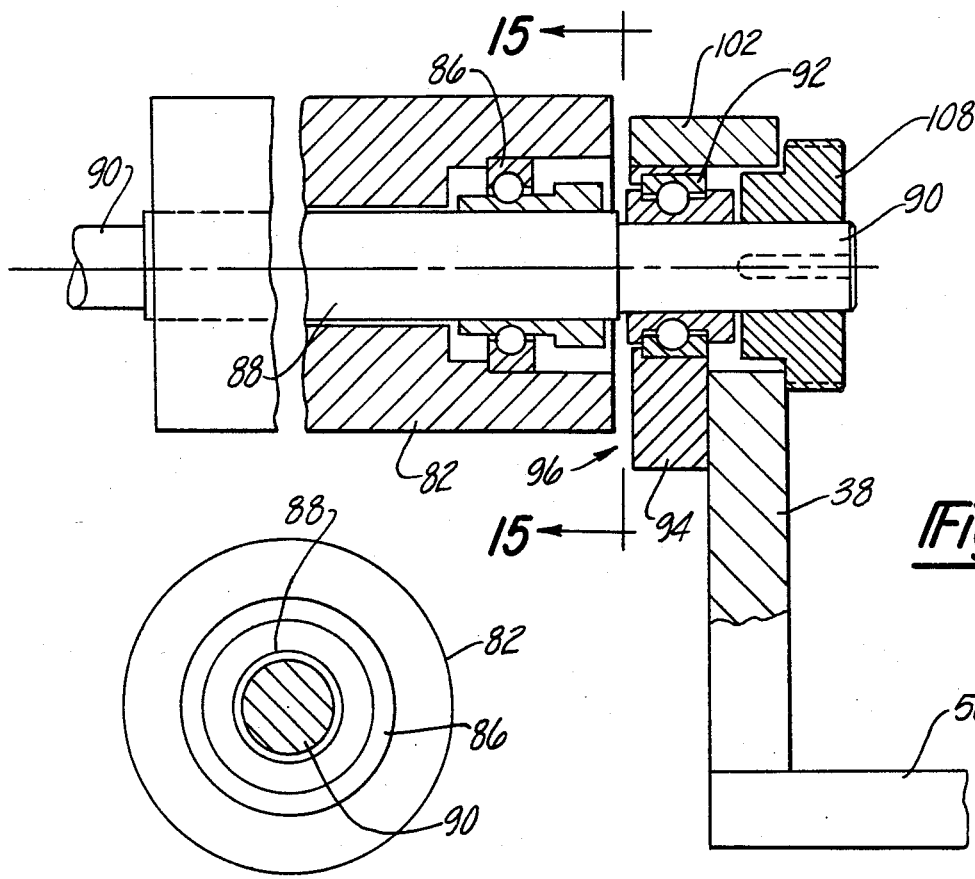
Fig-14
Fig-15

BATTERY GRID PASTING MACHINE

This is a continuation of Ser. No. 568,213 filed on Dec. 15, 1983, now abandoned.

This invention relates to a battery grid pasting machine.

Heretofore machines for applying electrochemically active paste on lead battery grids have generally been of two types. In one type the grids are fed forwardly on a cotton belt conveyor beneath the open lower end of a paste hopper. In that type of machine a considerably high downward pressure of the paste is applied to the belt-supported grids and also to the conveyor belt itself to fill the grids with paste. The high paste pressure not only requires a relatively high horse power to operate the belt conveyor and the paste hopper mechanism, but frequently results in distortion of the soft lead grids because the underlying belt, usually made of cotton and having a thickness of between about 7/32" to 5/16", compresses by varying amounts. In addition, the thickness of the paste layer is usually not too precise because such cotton belts will vary substantially in thickness from one section to another and the method of setting and controlling pasted plate thickness is not very precise. Cotton belts also have the disadvantage of being difficult to clean the paste accumulating thereon in that they become paste saturated to an unusable condition within a matter of only several days.

The other type of grid pasting machine commonly employed is one in which the lower end of the hopper, instead of being open as in a belt type pasting machine, is closed by a plate having an orifice slot therethrough which extends transversely of the direction of travel of the grid beneath the hopper. In one respect grid pasting machines having an orifice type hopper have the advantage of enabling pasting both sides of a battery grid more readily than is possible with a belt type pasting machine. However, in pasting machines that employ an orifice plate at the lower end of the hopper, the grids are advanced toward and through the pasting mechanism below the hopper by means of feed rolls which push the grids in end abutting relation. Lead battery grids are soft and flexible and, as a result, are frequently distorted when fed through the pasting mechanism in this manner.

The primary object of this invention is to precisely control in a variable manner the thickness of paste applied to a battery grid.

Another object of this invention is to provide a battery grid pasting machine utilizing a belt conveyor for feeding the grids beneath a hopper of the orifice type, the machine being designed to apply paste to both sides of the grid.

Another object of this invention is to provide a machine of the type described which can be operated at relatively high speed with relatively low horse power.

Another object of this invention is to provide a machine of the type described adapted to apply paste to both the top side and the under side of a battery grid at a high rate of speed without distorting the grid.

A further object of the invention is to provide means for easily and accurately adjusting the amount of paste applied to a battery grid and thereby control within precise limits the thickness and/or weight of the pasted grid.

Still another object of this invention is to provide a pasting machine which can be operated continuously for long periods of time without servicing and which is designed so that it can be serviced easily when required.

Other objects, features and advantages of the present invention will become apparent from the following description and accompanying drawings, in which:

FIG. 4 is a diagrammatic view illustrating the operation of the machine;

FIG. 5 is a fragmentary sectional view of a pasted grid;

FIG. 8 is a sectional view taken along the line 8—8 in FIG. 7;

FIG. 9 is an exploded fragmentary perspective view, with parts broken away, of the lower portion of the hopper;

FIG. 10 is an enlarged diagrammatic view which illustrates the manner in which paste is applied to the battery grid;

FIG. 13 is a sectional view along the line 13—13 in FIG. 11;

FIG. 14 is a sectional view along the line 14—14 in FIG. 11;

FIG. 15 is a sectional view along the line 15—15 in FIG. 14;

Figure 1:
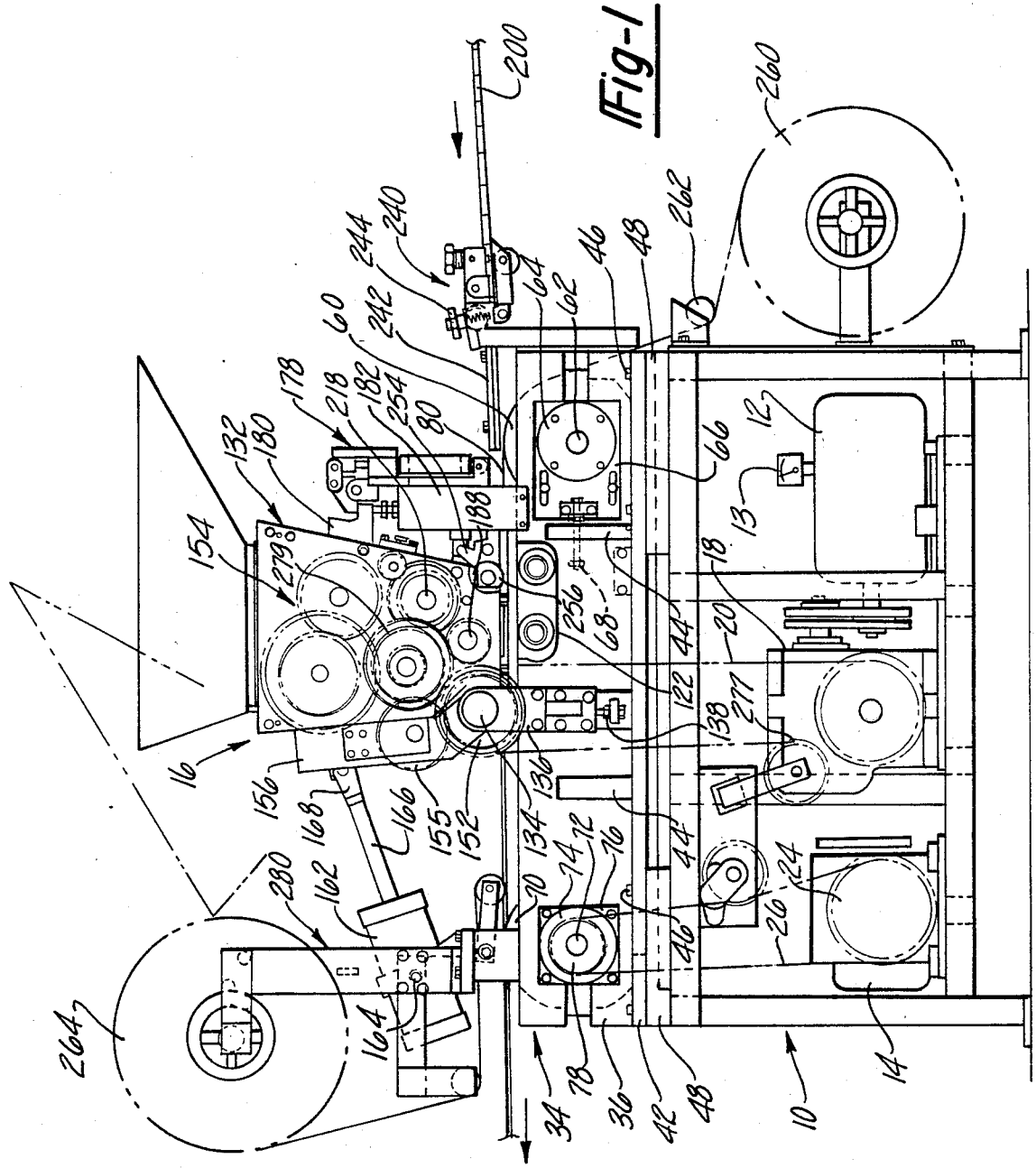
FIG. 1 is an elevational view of the rear or drive side of the grid pasting machine.
Figure 2:
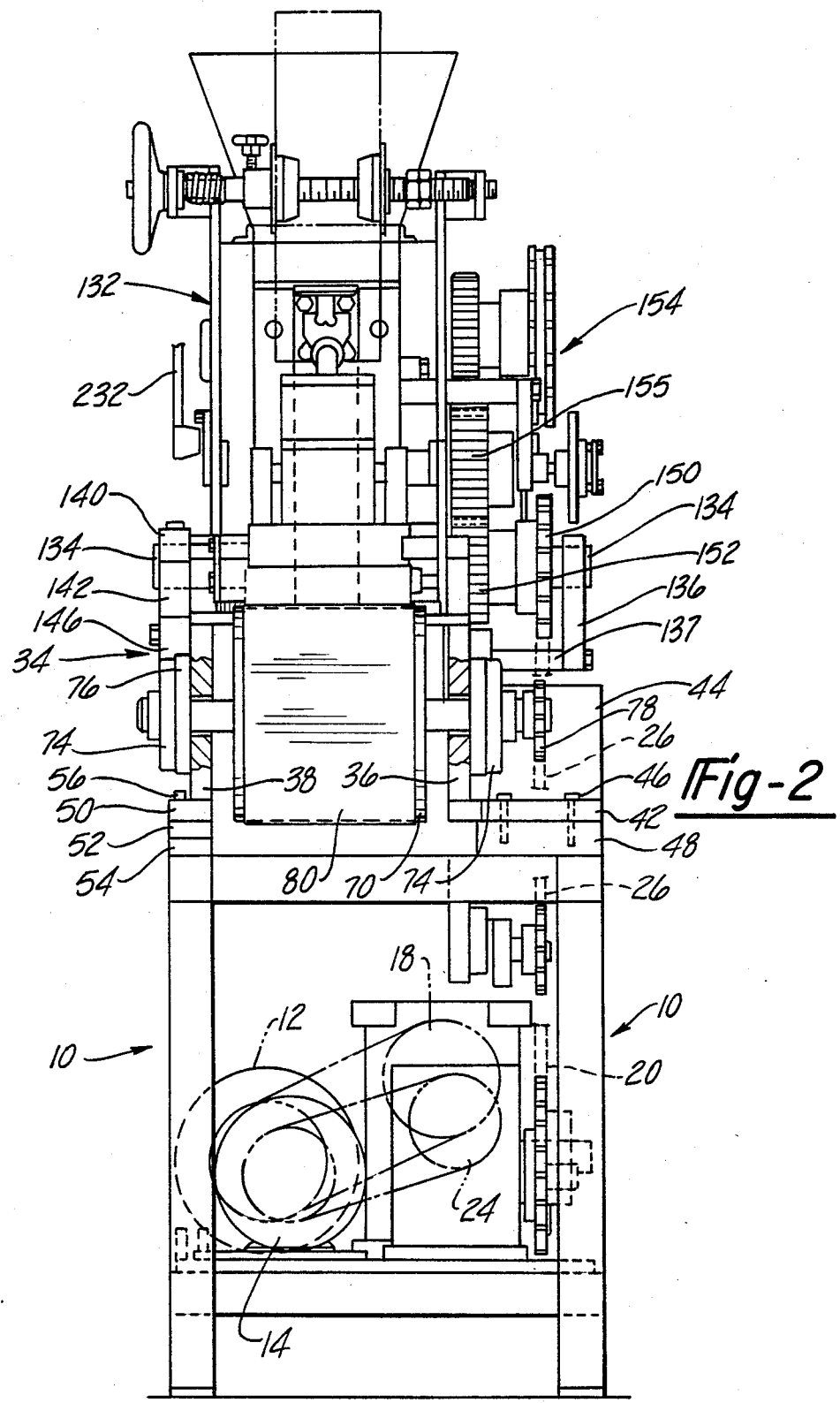
FIG. 2 is an end view, partly in section, of the machine as viewed from the grid discharge end thereof.
Figure 3:
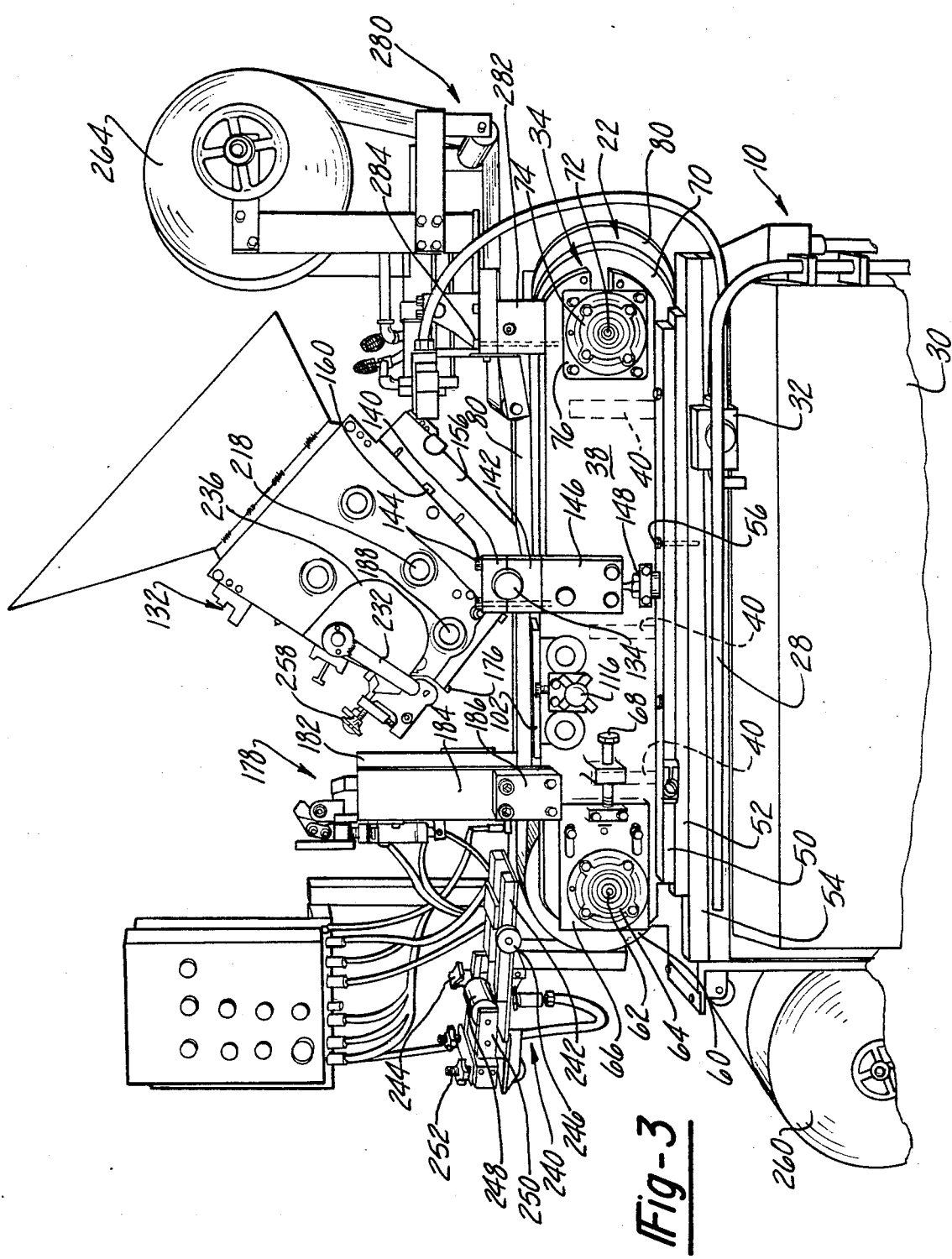
FIG. 3 is a fragmentary elevational view of the front or operator's side of the machine.

Referring to FIGS. 1 to 3, the machine includes a lower support frame 10 on which is supporting a drive motor 12 for the paste applying mechanism and a drive motor 14 for a belt conveyor. The speed of motor 12 can be varied relative to the speed of the belt conveyor by any suitable means, such as a potentiometer 13. The paste applying mechanism, generally designated 16, is driven by motor 12 through a gear reducer 18 and chain 20. The belt conveyor, generally designated 22, is driven by motor 14 through a grear reducer 24 and chain 26. The chain drives 20,26 are located at the rear side of the machine, the side shown in FIG. 1 and at the right of FIG. 2. The front side of the machine, illustrated in FIG. 3, is the side at which the operator stands. At the front side of the machine there is pivoted a long horizontal bar 28 directly above a front cover 30 on frame 10 which, when pushed toward the machine, actuates an emergency switch 32 for de-energizing motors 12 and 14 and, thus, immediately stopping operation of the machine.

Figure 17:
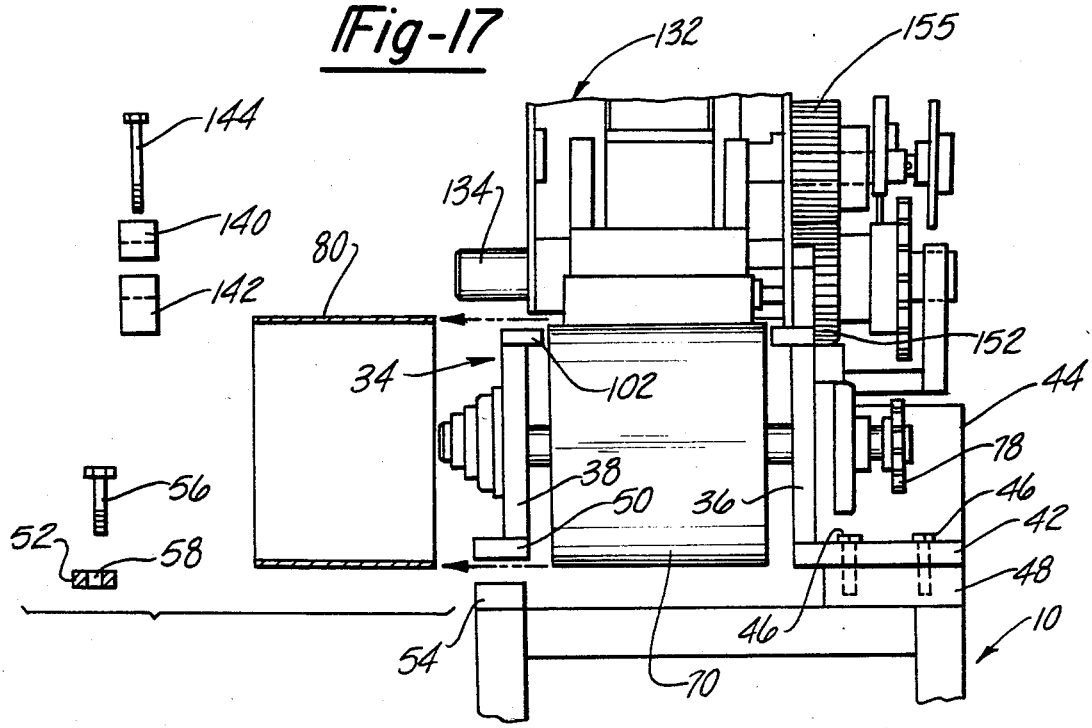
FIG. 17 is an exploded end view illustrating the manner in which the belt may be removed from the machine for servicing.

An upper frame 34 is supported on the lower frame 10. Upper frame 34 has a rear side wall 36 and a front side wall 38 rigidly connected together as a weldment by brackets 40 extending transversely therebetween (FIG. 3). As shown in FIG. 2, a base plate 42 is welded to the lower edge of the rear wall 36 and a pair of rectangular reinforcing gusset plates 44 are welded to rear wall 36 and base plate 42. Base plate 42 is in turn rigidly secured, as by screws 46, to support bars 48 which are welded to the upper edge of lower frame 10 at the rear side thereof. The front side wall 38 of upper frame 34 has a bar 50 welded to the lower edge thereof which overlies a spacer bar 52 that rests upon a support bar 54 welded to the upper edge of frame 10 at the front side thereof. The front wall 38 of frame 34 is clamped on support bar 54 by means of screws 56. As shown in FIG. 17, bar 52 is formed with holes 58 through which the screws 56 extend so that, when screws 56 are removed, bar 52 can be withdrawn from the front side of the machine from between bars 50 and 54. It is therefore apparent from FIG. 17 that, when bar 52 is withdrawn from between bars 50,54, the upper frame 34 is supported in cantilever fashion from the rear side of lower frame 10.

At the grid inlet end of the machine (the end at the right of FIG. 1) there is journalled between walls 36,38 a belt conveyor roller 60. Roller 60 is an idler roller keyed to a shaft 62 supported at its opposite ends in bearings 64. Bearings 64 are secured to plates 66 which are in turn mounted on the outer faces of the walls 36,38 of frame 34. Each bearing support plate 66 is adjustable in a longitudinal direction by means of screws 68. At the opposite end of the frame 34 there is arranged between walls 36,38 a conveyor belt drive roller 70 keyed to a shaft 72, the opposite ends of which are journalled in bearings 74 mounted on plates 76. Plates 76 are secured to the outer faces of walls 36,38. As explained hereinafter, the top of roller 60 is located slightly below the top of roller 70. At the rear end of shaft 72 there is keyed a sprocket 78 around which the drive chain 26 is trained. An endless conveyor belt 80, preferably stainless steel, extends around rollers 60,70. The rollers 60,70 are slightly crowned so that the adjusting screws 68 can be employed not only to apply tension to belt 80, but also to shift the belt laterally for tracking purposes.

Figure 12:
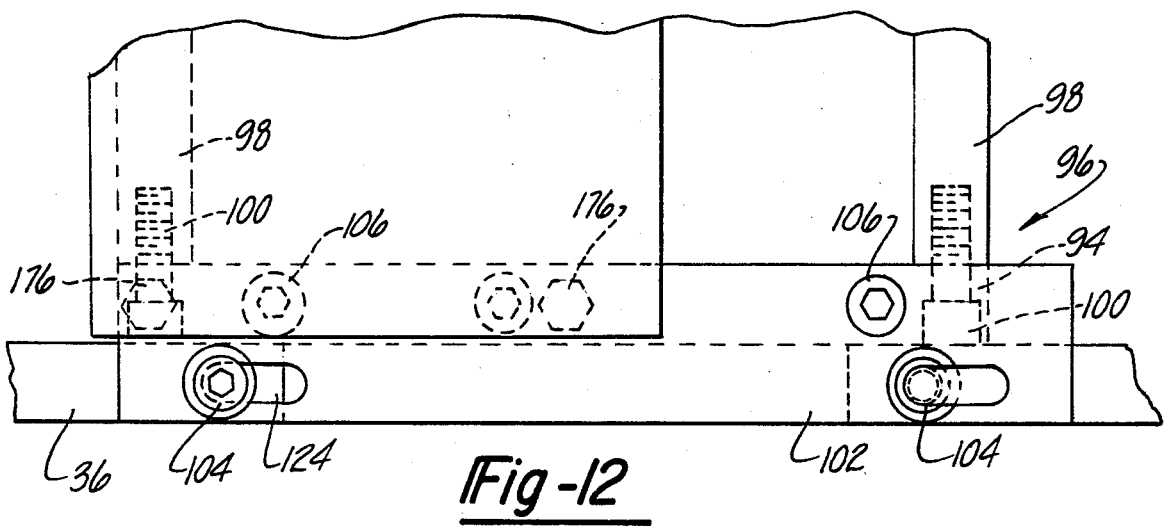
FIG. 12 is a top view of the portion of the machine shown in FIG. 11.
Figure 11:
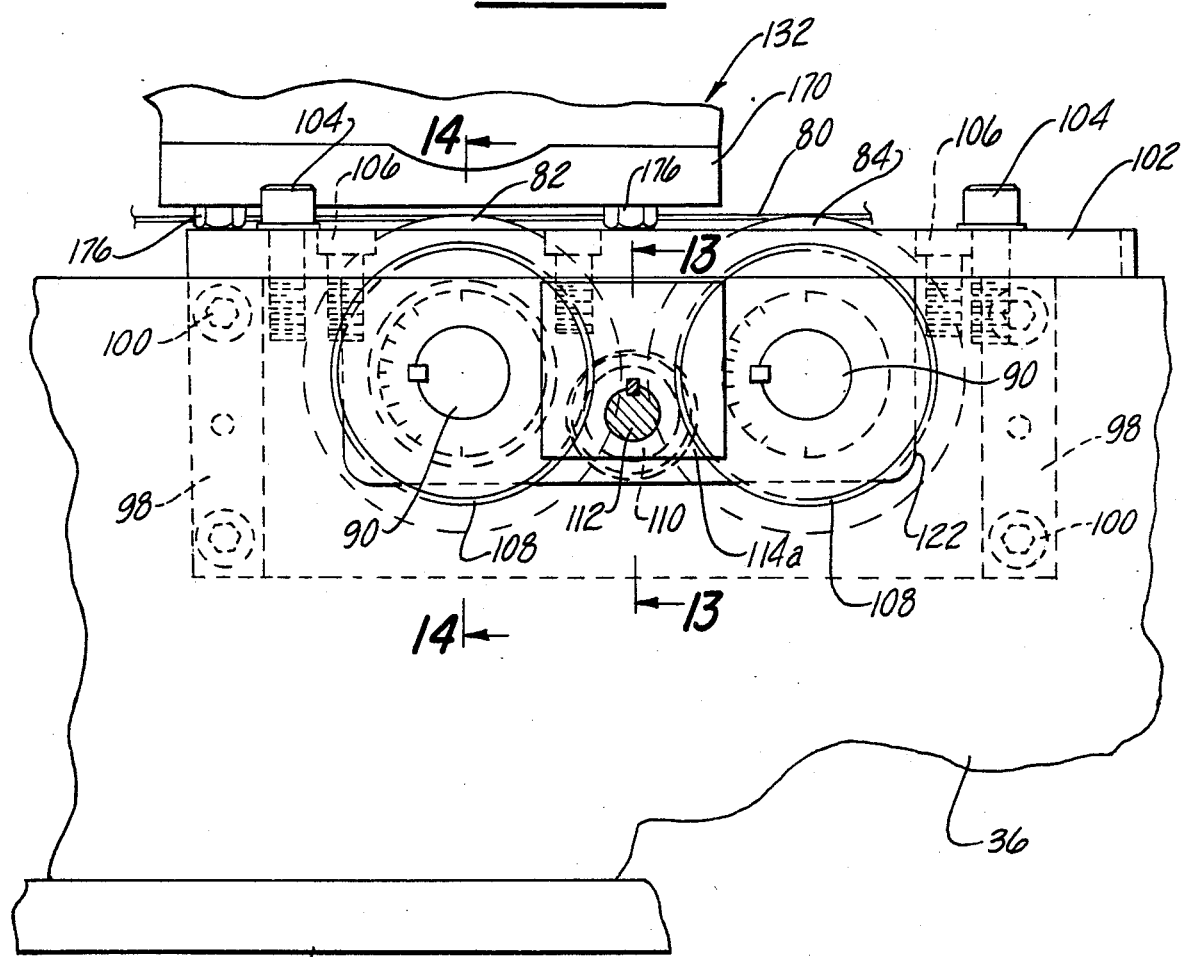
FIG. 11 is a fragmentary side elevational view illustrating the lower end of the hopper and the support roller assembly for the belt.

Intermediate rollers 60,70 the top run of belt 80 is supported by a pair of rollers 82,84 (FIG. 11). Rollers 82,84 are journalled by bearings 86 on the central eccentric portion 88 of shafts 90 (FIG. 14). The opposite ends of shafts 90 are aligned axially and journalled in bearings 92 that are mounted in front and rear side plates 94 of a roller support box 96. The side plates 94 (only one of which is illustrated in FIGS. 12 and 14) are interconnected by cross plates 98 to which they are secured by screws 100. The front and rear side plates 94 cooperate with the cross plates 98 to form a rectangular box in which the shafts 90 for the rollers 82,84 are journalled. The box 96 is supported on the front and rear walls 38,36 of upper frame 34 by a pair of top plates 102 which are secured to the upper edges of the front and rear walls of the upper frame by screws 104 and to the upper edges of the side plates 94 by screws 106.

At the front side of the machine shafts 90 project outwardly beyond the front side wall 38 and have gears 108 keyed thereto. Both gears 108 mesh with an intermediate gear 110 keyed to a stub shaft 112 (FIG. 13). Stub shaft 112 is supported for rotation by a bracket 114,114a on the front wall 94 of box 96. An indexing knob 116 is pinned to the outer end of shaft 112 and a second gear 118 is keyed to shaft 112 axially adjacent gear 110. The end of a retractable spring plunger 120 on bracket 114 is adapted to be advanced and retracted radially into and out of engagement with the teeth of gear 118 to lock or release the gear.

From the above description it will be observed that, when knob 116 is rotated in either direction, even while the machine is operating, the shafts 90 are correspondingly rotated and, since the rollers 82,84 are supported on the eccentric portions 88 of these shafts, both rollers are raised and lowered precisely to the same extent. The front and rear side walls 38,36 of upper frame 34 are notched as at 122 adjacent each side of box 96 so that, when screws 104 are removed, the box and rollers can be lifted and removed from between the front and rear side walls 38,36 of upper frame 34. It will also be observed from FIG. 12 that the openings 124 in the top plate 102 through which screws 104 extend are elongated to permit the box assembly 96 to be shifted longitudinally within upper frame 34 a limited extent.

The paste applying mechanism 16 includes a hopper 132 supported for pivotal movement above the top run of belt 80 on a shaft 134. At the rear side of the machine shaft 134 is supported by an upright bracket 136 secured by screws and a spacer bracket 137 to the outer face of the rear wall 36 (FIG. 2). An adjusting screw 138 enables bracket 136 to be shifted vertically within a limited extent. At the front side of the machine shaft 134 is clamped between upper and lower yokes 140,142 which in turn are secured by screws 144 to an upright bracket 146 secured to the outer face of the front wall 38 of frame 34. An adjusting screw 148 enables bracket 146 to be shifted vertically through a limited extent.

On the rear end portion of shaft 134 there is journalled a sprocket 150 around which the drive chain 20 extends. Sprocket 150 is axially coupled to a gear 152 journalled on shaft 134 concentric with sprocket 150. Gear 152 forms the main drive gear for a drive train 154 at the rear side of hopper 132. Drive train 154 consists of a plurality of gears and sprockets for driving rotating members within the hopper as more fully explained hereinafter. Gear 155 of gear train 154 meshes with gear 152.

Figure 16:
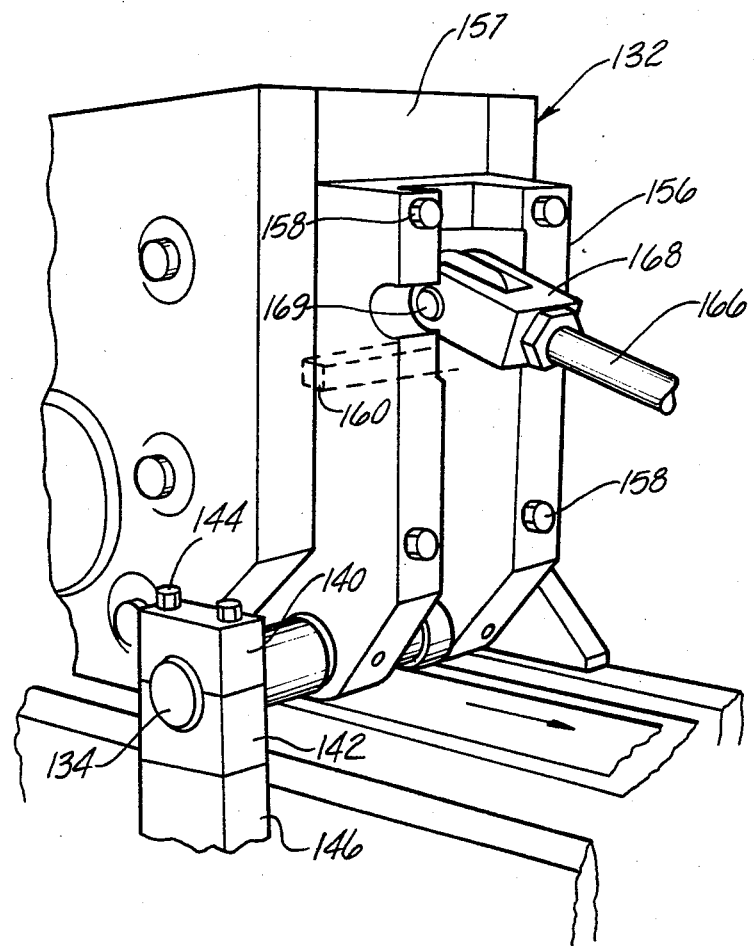
FIG. 16 is a fragmentary perspective view of a portion of the machine adjacent the downstream end of the hopper.

As shown in FIG. 16, hopper 132 is pivotally supported on shaft 134 by means of a bracket 156 secured to an end wall 157 of the hopper by means of screws 158. Bracket 156 and end wall 157 of hopper 132 are formed with registering slots that receive a key 160 which insures that the hopper will be accurately positioned with respect to the axis of shaft 134 when it is mounted on bracket 156. A pneumatic cylinder 162 pivotally supported as at 164 has a piston rod 166 pivotally connected as by a clevis 168 to hopper 132 as at 169. Cylinder 162 is adapted to be actuated through suitable controls to tilt the hopper from the operative position shown in solid lines in FIG. 1 to the servicing position shown in FIG. 3.

Referring to FIGS. 9, 11 and 12, it will be observed that the lower end of the hopper is closed by an orifice plate 170 secured in place by screws 172. At each of the four corners of orifice plate 170 there is provided a threaded opening 174 which overlies the top plate 102 that interconnects the support roller box 96 with the front and rear side walls of the upper frame 34. Openings 174 receive headed screws 176 which, in the operative position of the hopper, abut against the top face of the top plate 102. The heads of screws 176, the bottom face of orifice plate 170 and the top faces of plates 102 are accurately machined so that, when the hopper is in the operative position illustrated in FIG. 1, the bottom face of orifice plate 170 lies in a plane parallel to and spaced a precise dimension above the plane of the top faces of the plates 102. The hopper is arranged to be retained in this accurately located operative position by means of a clamp mechanism 178 which engages a lug 180 on the end wall 181 of the hopper. Clamp mechanism 178 is cantilever supported at the rear side of the machine by means of a bracket 182 mounted on the rear side wall 36 of frame 34. At the front side of the machine the clamp mechanism 178 is supported by an upright bracket 184, the lower end of which is connected to the front side wall 38 of frame 34 by means of a removable spacer bracket 186.

Between the front and rear side walls of hopper 132 and adjacent the lower end thereof there is journalled on a shaft 188 a paste delivery roller 190 (FIGS. 9 and 10). The axis of shaft 188 is spaced above the top face of orifice plate 170 a distance less than the radius of feed roller 190. Accordingly, the orifice plate is formed on the upper side thereof with arcuate recesses 192 to accommodate the lower portion of the opposite ends of roller 190. There is also formed in orifice plate 170 between recesses 192 an orifice slot 194 extending downwardly through the plate at an angle inclined to the bottom face of the plate as shown in FIG. 10. Orifice slot 194 extends transversely of the hopper a distance corresponding to the width of the grid to be pasted, which is normally less than the length of the paste delivery roller 190. As shown in FIGS. 4 and 10, orifice slot 194 is inclined downwardly in the direction of travel of the grid beneath the orifice hopper as will be explained hereinafter. On the downstream side of orifice slot 194 the upper face of the orifice plate is also provided with an arcuate clearance space 196 which increases progressively in size from the orifice slot in the direction of rotation of roller 190.

On the upstream side of orifice slot 194 the bottom face of orifice plate 170 is formed with a downwardly inclined guide surface 198 for the grid to be pasted. In the illustrated embodiment the grid is in the form of a continuous web 200 which is advanced to the pasting machine from a continuous casting machine (not illustrated). As shown in FIGS. 4 and 10, the support roller box 96 is adjusted longitudinally on frame 34 so that the upstream side 202 of the orifice slot 194 intersects the bottom face 204 of the orifice plate upstream from the axis of roller 82 and the downstream side 206 of the orifice slot 194 intersects the bottom face 204 of the orifice plate directly above or slightly downstream from the axis of belt support roller 82. The downwardly inclined guide 198 intersects the bottom face 204 of the orifice plate just slightly upstream from the upstream side 202 of the orifice slot. The top of rollers 82,84 lie in the same horizontal plane and the bottom face 204 of the orifice plate is parallel thereto. The downstream end portion of the bottom face of orifice plate 170 is vertically relieved as at 208 (FIG. 10). Since the idler roller 60 is slightly crowned and its top surface is spaced below the top surface of roller 84, belt support roller 84 tends to flatten the upwardly inclined belt before it reaches a position underlying orifice slot 194.

Referring now to FIG. 4, there is arranged within hopper 132 a plurality of paddles 210 for feeding paste downwardly. In addition to paste delivery roller 190 there is also arranged within the hopper a paste feed roller 212. These paddles and feed rollers are keyed to the respective shafts on which they are mounted and the shafts are driven by the drive train 154 at the rear side of the hopper. Feed roller 212 is located in the hopper above feed roller 190 and at one side thereof. The adjacent knurled surfaces of rollers 190,212 are spaced apart to define therebetween a paste feed passageway 214 which extends downwardly to orifice slot 194. The amount of paste fed through orifice slot 194 is determined by the width of the portion of feed passageway 214 between these rollers and by the speed of rotation of rollers 190,212 in relation to the speed of belt 80. In the present arrangement means are provided for shifting roller 212 radially with respect to roller 190 so as to vary the width of feed passageway 214.

Figure 7:
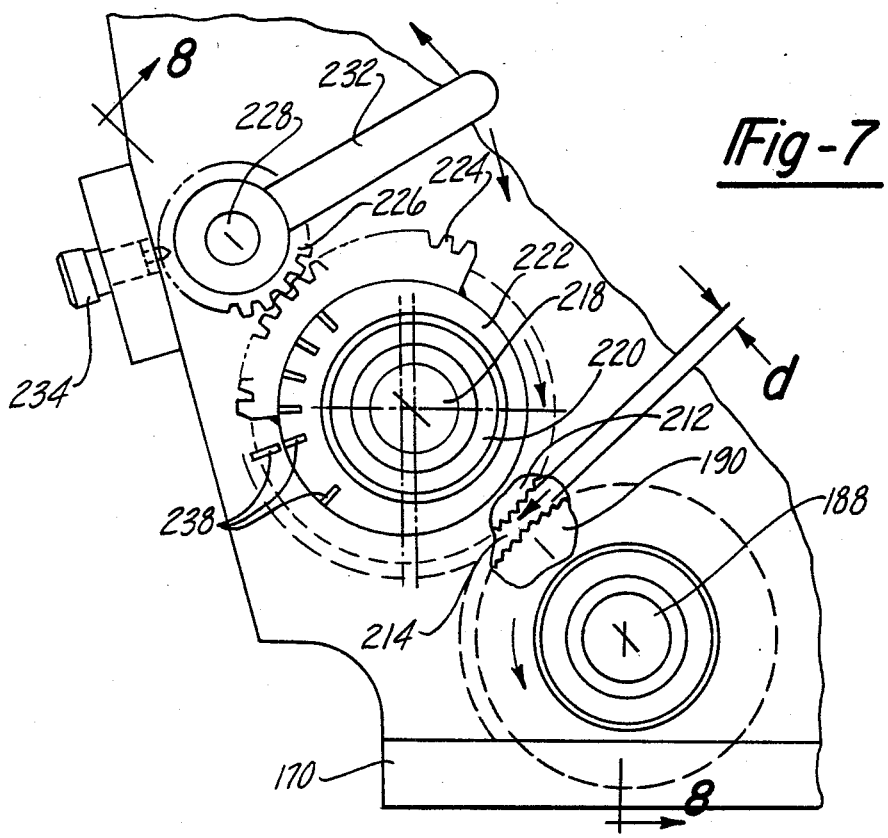
FIG. 7 is a fragmentary side elevational view of the hopper with a cover member removed.

The means for shifting roller 212 radially are illustrated in FIGS. 7 and 8. The shaft to which feed roller 212 is keyed is designated 218. The opposite end portions of shaft 218 are journalled in bearings 220. Bearings 220 are in turn eccentrically mounted in bushings 222 rotatably supported in the opposite side walls of the hopper. Each bushing 222 has welded thereto a gear segment 224 which meshes with a small gear 226 keyed to the opposite ends of a shaft 228 journalled in the side walls of the hopper by bushings 230. At the front side of the machine there is pinned to shaft 228 a handle 232 for rotating gears 226. A retractable spring plunger 234, adapted to be advanced and retracted into and out of engagement with the teeth of gear 226, is mounted on the hopper for locking or releasing gears 226. In FIG. 3 a cover 236 is shown enclosing gear sector 224 and gear 226 at the front side of the machine. In view of the fact that shaft 218, which drives feed roller 212, is eccentrically mounted in bushings 222, it follows that, when bushings 222 are rotated in opposite directions by handle 232, feed roller 212 is shifted toward and away from delivery roller 190. The eccentricity of bushings 222 and the arcuate extent of gear sector 224 are such that roller 212 can be shifted radially a maximum extent of not more than about 0.050". Radial movement to this extent of shaft 218 on which the drive gear for roller 212 is mounted will not affect the intermeshing relation of the gears in drive train 154 at the rear side of the hopper. The extent to which gear sector 224 is rotated in either direction is determined by indicia marks 238 on the front bushing 222 and the front side wall of the hopper.

Referring now to FIGS. 1 and 3, at the grid entry end of the machine there is arranged a grid inlet guide mechanism 240 which includes a downwardly inclined guide plate 242, the vertical inclination of which is adapted to be adjusted by a screw 244. Lateral adjustment of guide plate 242 is obtained by an adjusting screw 246. At the entry end of guide plate 242 there is arranged a roller 248 journalled between a pair of bell cranks 250, the angular position of which is adjustable by screws 252. Roller 248 is adapted to bear downwardly on the grid web being fed to the pasting machine. Guide mechanism 240 is designed to direct the web 200 downwardly at an angle in the downstream direction toward belt 80. At the lower upstream corner of hopper 132 there is journalled between pivotally supported plates 254 a grid positioning roller 256 adapted to press downwardly on the grid web being directed beneath hopper 132. Roller 256 is spring biased upwardly to the extent permitted by a pair of adjusting screws 258.

The under side of the grid web 200 is underlaid with a paper film from a supply roll 260, the paper being directed around an idler roller 262 and then onto belt 80 as it travels upwardly around roller 60. After the grid is pasted, a layer of paper from a supply roll 264 is applied to the upper face of the pasted web. As soon as the paper layers contact the pasted web, they become wetted by the paste and consequently adhere thereto. When the lower paper film becomes wetted by the paste it also provides a good tractive force between the pasted grid and belt 80.

Figure 6:
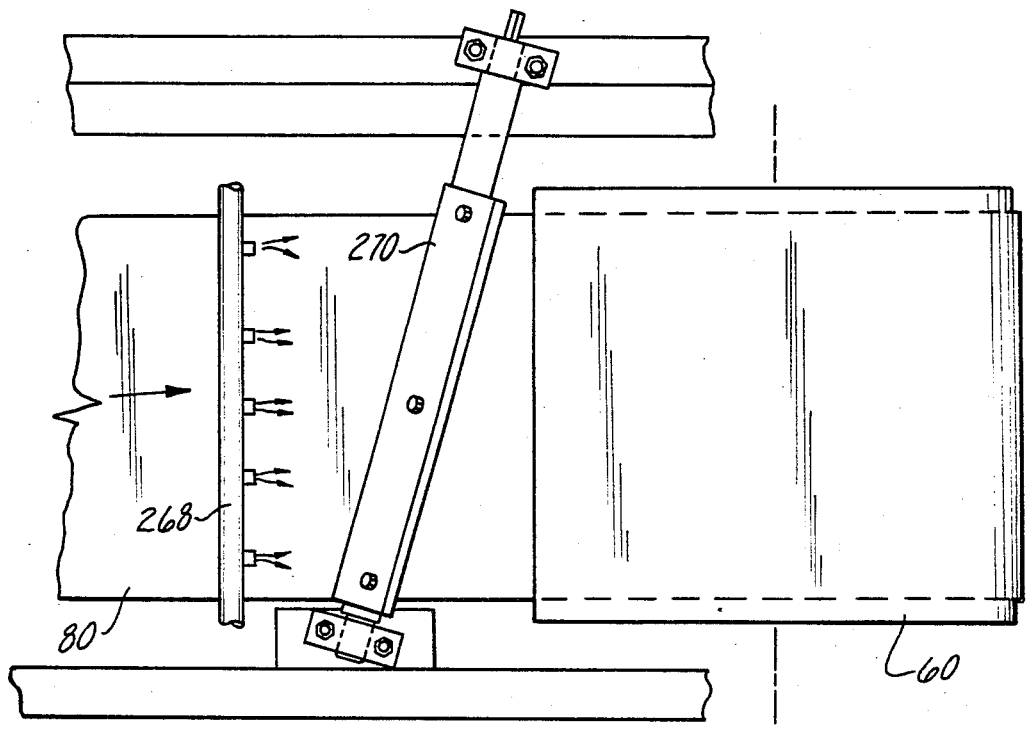
FIG. 6 is a fragmentary view of the belt spraying and wiper mechanism as viewed along the line 6—6 in FIG. 4.

In the operation of applying paste to the grid web there is a likelihood that paste may become deposited on both the inner and outer faces of belt 80. The outer face of belt 80 is cleaned by a scraper 266 (FIG. 4) located at the underside of belt conveyor roller 70. As shown in FIG. 4 there is also arranged between the two belt conveyor rollers 60 and 70 and between the upper and lower runs of the belt a plurality of spray pipes 268 for applying water or other cleansing fluid to the upper surface of the lower run of the belt, the outer surfaces of rollers 60,70 and the outer peripheral surfaces of rollers 82,84. The grit washed off these rollers by the cleansing fluid gravitates to the upper side of the lower run of belt 80 and is removed therefrom by an angled scraper 270 (FIG. 6).

The manner in which the pasting machine operates is best illustrated in FIGS. 4 and 10. Initially the belt support rollers 82,84 are adjusted vertically to attain the desired vertical spacing between the top run of the belt and the bottom face of orifice plate 170 adjacent the orifice slot 194. Paste feed roller 212 is also adjusted by rotating crank 232 to obtain the desired width of the paste feed passageway 214. The amount of paste applied to the grid, which determines the thickness and density of the paste layer, depends upon the amount of paste fed through orifice slot 194 and the speed of rotation of rollers 190,212 in relation to the speed of belt 80. Thus, more or less paste can be fed to the grid web by varying the speed of the rollers 190,212 in relation to the speed of belt 80 and also by adjusting roller 212 toward and away from roller 190. The thickness of the pasted web is determined primarily by the vertical dimension between the top side of belt 80 and the bottom face 204 of orifice plate 170 adjacent orifice slot 194. The desired dimension of this space is obtained by raising or lowering belt support rollers 82,84 by means of adjusting knob 116 on box 96. It will be appreciated, however, that after operation of the machine is initiated, knob 116 and handle 232 can be further adjusted as desired while the machine is operating.

After the initial adjustments are made, operation of the machine is initiated and the web 200 is directed onto plate 242 and under roller 256 in a downwardly inclined orientation to the underside of the hopper. By reason of the grid positioning roller 256 and the downwardly inclined guide surface 198 on the underside of orifice plate 170, the grid web 200 will be in sliding engagement with guide surface 198 and the lower face of the web will be spaced slightly above the paper laminate 272 which is supported on and advancing with belt 80. Since the upstream side 202 of orifice slot 194 is located slightly upstream from the axis of roller 82, paste directed through the orifice slot 194 will be forced downwardly through the grid and into the space between the lower face of the grid web 200 and the paper laminate 272. As the web advances, the pressure of the paste acting on the web will press the web downwardly toward the paper laminate and the paste will therefore also coat the top side of the web.

As pointed out previously, since the paper laminate 272 underlying the web is wetted by the paste, excellent traction is established between the belt and the web. This traction coupled with the fact that the paste in the orifice slot 194 is not at a relatively high pressure as compared with conventional pasting machines using a cotton belt conveyor results in a relatively low power requirement to drive the belt conveyor. As the pasted grid advances beyond the hopper, the upper paper laminate 274 may be applied to the top face of the paste layer. The completely pasted and paper laminated web grid is illustrated in FIG. 5. It will be noted from FIG. 5 that the paste, designated 276, extends below the bottom face of the grid web and above the top face of the grid web.

It will be appreciated that, when it is desired to paste a grid of substantially different thickness from the grid previously pasted, it is only necessary to raise or lower the hopper relative to the top run of the belt. This is accomplished by removing the stop screw 176 from orifice plate 170 and replacing them with similar screws having the desired head thickness for the grid to be pasted. Thereafter, the screws by means of which the upright support brackets 136,146 are attached to the front and rear side walls of upper frame 34 are loosened and the vertical adjusting screws 138,148 are rotated as required so that in the operative position of the hopper the four stop screws 176 are again seated solidly on the top plates 102 at each side of frame 34. The chain tensioning sprocket 277 engaging chain 20 (FIG. 1) allows raising and lowering of sprocket 150.

If a grid of different width is to be pasted, it is only necessary to remove orifice plate 170 from the lower end of the hopper and replace it with a similar plate in which the orifice slot has a width corresponding to the width of the grid to be pasted. It is not necessary to replace roller 190 since the recesses 192 on each orifice plate will accommodate the same roller 190. The orifice plates differ from one another only in the length of the orifice slot 194 therein.

In view of the fact that the hopper 132 is supported in cantilever fashion from the rear side of the machine, in order to remove the hopper from the machine it is only necessary to remove screws 144 that secure yokes 140,142 to bracket 146 at the front side of the machine. The hopper can then be slid axially off shaft 134. It will also be appreciated that, if desired, the hopper can be removed from the machine by tilting it to the servicing position illustrated in FIG. 3 and removing screws 158 (FIG. 16). The hopper can then be lifted vertically off the supporting bracket 156 since gear 279, the primary drive gear journalled on the hopper, can be readily lifted out of meshing engagement with drive gear 155 journalled on bracket 156. This represents an expeditious manner of removing the hopper to a remote location for washing so as to avoid getting paste-laden water all over the machine. When the same or similar hopper is replaced, key 160 is engaged with the associated keyways on bracket 156 and the end wall of the hopper to insure that the hopper is accurately positioned with respect to the belt and the belt support rollers.

It will be understood that occasionally it will be necessary to replace the belt 80. This can be accomplished in a minimum of time since the entire upper frame 34 is cantilever supported from the rear side of the lower frame 10. Thus, to remove the belt the spacer bar 52 is withdrawn from between bars 50,54. Likewise, yokes 140,142 are removed and spacer bracket 186 which supports the front side of the clamp mechanism 178 is removed. The paper supply roll 264 is supported on a frame 280 that is also mounted on the rear side of upper frame 34 in cantilever fashion. The pivot support 164 for the hopper tilt cylinder 162 is also mounted on frame 280. At the front side of the machine frame 280 is supported by a spacer plate 282 secured to the upper edge of the front wall 38 of frame 34 by means of screws 284. Plate 282 is also removed to withdraw the belt from the conveyor rollers 60,70. Since rollers 60,70 project radially beyond the opposite ends of front wall 38 and since the top run of belt 80 is spaced above the upper edge of front wall 38 and the lower run of the belt is located horizontally in line with spacer bar 52, it is apparent that, after plates 140,142,186,282 and bar 52 are removed, the belt 80 can be slid axially off rollers 60, 70 and replaced with another belt. Thus, both the hopper and the belt can be removed from the machine for servicing or replacement, with a minimum of time and effort. However, it will be appreciated that, if the belt is stainless steel, replacement is required very infrequently as compared with a fabric belt.

I claim:

1. A battery grid pasting machine having a conveyor, an endless metal belt carried by said conveyor and having a top run with a generally horizontally extending outer face on which battery grids are adapted to be supported and conveyed in one direction, a belt support roller on the underside of and supporting the top run of the belt, a paste hopper having an orifice plate spaced above the belt and overlying said belt support roller, said orifice plate having an orifice slot therethrough which overlies and extends transversely across the belt, means in the hopper for feeding paste downwardly through said orifice slot at a predetermined rate, the entire bottom of said orifice plate being spaced throughout from and above the outer face of the underlying portion of the top run of said belt to provide a clearance therebetween at least slightly greater than the thickness of the grid to be pasted, said bottom of the orifice plate having a portion adjacent and downstream of the orifice slot which is spaced from and above the outer face of the underlying portion of the top run of said belt so that there is a clearance therebetween slightly greater than the thickness of the grid to be pasted for controlling the thickness of the paste applied to the grid, at least a portion of the bottom of said orifice plate adjacent to and upstream of said orifice slot being spaced from and above the outer surface of an underlying portion of the top run of said belt such that there is a clearance therebetween greater than said clearance between said bottom portion downstream of said orifice and its associated underlying portion of the top run of said belt, said orifice slot having an upstream edge located at least slightly upstream from the uppermost portion of said belt support roller and guide means constructed and arranged to guide a grid between said belt and said orifice plate at an angle inclined to the outer surface of at least a portion of the top run of said belt adjacent to and upstream of said orifice slot so that as such grid passes beneath the orifice slot the face of such grid adjacent said belt is spaced slightly from and above the outer surface of the immediately underlying portion of the top run of said belt to provide a clearance therebetween such that paste being fed from said orifice slot passes through the grid and enters into such clearance, whereby both faces of the grid are covered with paste and the grid is overpasted.

2. A battery grid pasting machine as called for in claim 1 wherein said guide means also comprises, a guide surface on said orifice plate, adjacent to and upstream of said orifice slot, generally opposed to an underlying portion of the top run of said belt and spaced from and above the outer face of the underlying portion of the top run of said belt a distance greater than the distance between said bottom portion downstream of said orifice and the outer face of its associated underlying portion of the top run of said belt, and said guide means is constructed and arranged to guide the grid at an angle inclined downwardly to the plane of the outer face of a portion of the top run of the belt adjacent to and downstream of said orifice slot to provide a clearance space between the face of the grid adjacent said belt and the outer face of the immediately underlying portion of said belt adjacent the upstream side of said support roller such that paste directed downwardly through the orifice slot penetrates through the battery grid into said clearance space.

3. A battery grid pasting machine as called for in claim 2 wherein said belt support roller has an axis of rotation generally transverse of said belt and the upstream edge of said orifice slot is spaced upstream of the axis of rotation of the belt support roller.

4. A battery grid pasting machine as called for in claim 2 wherein said guide surface on said orifice plate is inclined downwardly in a downstream direction to the outer face of the portion of the top run of the belt underlying said bottom of said orifice plate.

5. A battery grid pasting machine as called for in claim 4 wherein said guide means is constructed and arranged to retain, in sliding engagement with said guide surface on said orifice plate, a face of the grid immediately adjacent said guide surface.

6. A battery grid pasting machine as called for in claim 4 wherein the grid is in the form of a continuous web conveyed through the pasting machine and said guide means is adapted to maintain the web in tension as it is advanced toward the orifice plate.

7. A battery grid pasting machine as called for in claim 1 wherein said bottom portion of said orifice plate immediately downstream from said orifice slot is substantially parallel to the outer face of the underlying portion of the top run of the belt.

8. A battery grid pasting machine as called for in claim 1 wherein said belt is formed of stainless steel.

9. A battery grid pasting machine as called for in claim 1 including means for directing cleansing fluid against an inner face of the lower run of the belt and scraper means positioned to engage said inner face of the belt downstream from said cleansing fluid directing means.

10. A battery grid pasting machine as called for in claim 1 wherein said conveyor comprises a pair of spaced apart carrier rollers, said belt extends around and is received on said carrier rollers and including means for directing cleansing fluid against said carrier and belt support rollers.

11. A battery grid pasting machine as called for in claim 1 including means for directing a web of paper between the grid and the outer surface of the top run of the belt as the grid is fed toward the hopper.

12. A battery grid pasting machine as called for in claim 1 including means for raising and lowering said belt support roller to vary the vertical spacing between the bottom face of the orifice plate and the underlying portion of the top run of the belt.

13. A battery grid pasting machine as called for in claim 1 including a frame on which the support roller is mounted, said frame having an accurately machined top support surface thereon, said orifice plate having an accurately machined bottom surface portion disposed vertically above and in parallel relation to said support surface on the frame and a plurality of accurately dimensioned spacers extending between and contacting said support surface and said accurately machined bottom surface portion of the orifice plate and means for applying a downward force on the hopper.

14. A battery grid pasting machine as called for in claim 13 wherein said spacers are threaded into one of said accurately machined surfaces.

15. A battery grid pasting machine as called for in claim 1 wherein said belt extends around a pair of belt carrier rollers and the means for feeding the paste through the orifice slot includes rotary driven paste feed and delivery rollers in said hopper and including means for varying the speed of the feed and delivery rollers relative to the speed of the belt carrier rollers.

16. A battery grid pasting machine as called for in claim 1 wherein said means in the hopper for feeding the paste through the orifice slot comprises a feed roller and a paste delivery roller journaled in said hopper above said orifice slot on parallel axes which extend transversely of the belt, said rollers having adjacent peripheral surface portions which are spaced apart so as to define therebetween a paste feed passageway which extends down to said orifice slot, means for rotating said feed and delivery rollers to advance paste through said feed passageway and means for shifting the rotary axis of one of said paste and feed rollers toward and away from the other to vary the distance between said adjacent peripheral surface portions of said rollers and hence the amount of paste delivered through said feed passageway to the orifice slot.

17. A battery grid pasting machine as called for in claim 16 wherein said one of said feed and delivery rollers is keyed to a rotary driven shaft and including a bearing supporting each end of said shaft, each bearing being eccentrically mounted within a bushing support on the hopper for rotation and means for rotating both bushings simultaneously and through the same arcuate extent to vary said distance between said adjacent peripheral surface portions of said rollers.

18. A battery grid pasting machine as called for in claim 17 wherein each of said bushings has a concentric gear thereon and said means for rotating the bushings comprises a shaft having a gear fixed to each of its opposite ends and in engagement with one of the gears on the bushings and means for rotating said shaft.

19. A battery grid pasting machine as called for in claim 1 wherein the belt extends around a crowned carrier roller located upstream of said belt support roller and including a circular cylindrical belt flattening roller bearing on said belt and positioned between said crowned carrier roller and said support roller for flattening the belt in advance of said belt support roller.

20. A battery grid pasting machine as called for in claim 1 including another belt support roller located under the top run of the belt upstream from said one belt support roller and means for vertically adjusting both of said belt support rollers.

21. A battery grid masting machine as called for in claim 20 wherein said means for vertically adjusting said belt support rollers is constructed and arranged to adjust both of said belt support rollers simultaneously and to the same extent.

22. A battery grid pasting machine as called for in claim 21 wherein the portions of said belt support rollers bearing on said belt lie in a horizontal plane substantially parallel to the bottom of the orifice plate.

23. A battery grid pasting machine as called for in claim 22 wherein said means for vertically adjusting said support rollers comprises a pair of parallel shafts each having a pair of opposite ends and an intermediate portion on which one of said rollers is supported for rotation, the opposite ends of each shaft being axially aligned, concentric and journaled in bearings, the intermediate portion of each shaft being eccentric relative to its opposite ends, said rollers being journaled on the intermediate portions of the shafts and means for rotating both shafts simultaneously and through the same arcuate extent.

24. A battery grid pasting machine comprising a frame, a conveyor supported on said frame and having an endless belt with a generally horizontally disposed top run, a support shaft on said frame extending transversely across the belt, a paste hopper slidably received and supported on said support shaft, pivotable about the axis of said support shaft from an operative position upwardly to a servicing position and slidably removable from said support shaft, said support shaft being supported at one end in cantilever fashion on said frame, a plurality of rotary paste feeding members in said hopper mounted on shafts generally parallel to the support shaft, a first drive member on the support shaft, second drive members on the shafts of the paste feeding members, a drive train connecting said first and second drive members to rotate the paste feeding members in response to rotation of the first drive member, a third drive member on said hopper support shaft, a motor having a driving connection with said third drive member, said first and third drive members being drivingly connected and journaled for rotation on said support shaft adjacent said one end thereof and said hopper being axially slidable off said support shaft in the direction toward the opposite end of said support shaft, whereby said hopper can be removed from the machine.

25. A battery grid pasting machine as called for in claim 24 including a bracket pivotally supported on said support shaft, means removably securing said paste hopper in accurately fixed position on said bracket, said hopper being pivotable with the bracket from such operative position overlying said belt upwardly to such servicing position, said paste hopper being removable from said bracket to disconnect the driving connection of said paste feeding members with said motor.

26. A battery grid pasting machine as called for in claim 25 including a generally horizontally extending key and keyway interconnecting said bracket and hopper for accurately positioning the hopper on said bracket.

27. A battery grid pasting machine as called for in claim 24 wherein the first drive member comprises a first gear having teeth extending in a direction axially of the support shaft and said drive train includes a primary drive second gear on the hopper having teeth meshing with the teeth of said first gear, said second gear being axially movable with the hopper to disengage it from said first gear.

28. A battery grid pasting machine comprising a lower frame and an upper frame, said upper frame being supported at one side thereof on the lower frame in cantilever fashion such that the bottom of the upper frame is spaced above the top of the lower frame at the other side thereof, a pair of rollers journalled on said top frame about generally parallel axes which extend transversely of the sides of the frame, the top of each roller projecting above the top of the upper frame and the bottom of each roller projecting below the bottom of the upper frame and above the top of the lower frame at said other side of the frames, the outer surface of one roller projecting radially outwardly beyond one end of the top frame and the other roller projecting radially outwardly beyond the other end of the upper frame whereby each roller is axially unobstructed around at least 180° by said upper and lower frames and a conveyor belt trained around said rollers, the top and bottom runs of said belt between said rollers registering horizontally with the spaces above and below said top frame at said other side thereof.

29. A battery grid pasting machine as called for in claim 28 including removable spacer means extending vertically between and connected to said frames at said other side thereof for supporting said other side of the upper frame on the lower frame.

30. A battery grid pasting machine as called for in claim 29 including a hopper support shaft extending transversely across and above the belt and supported in cantilever fashion at said one side of said frames, a hopper pivotably supported on said shaft and axially slideable off the shaft in a direction away from said one end of the shaft and removable bracket means extending vertically between and interconnecting said shaft and said frames at said other side thereof.

31. A battery grid pasting machine comprising; a conveyor, an endless belt carried by said conveyor and having a top run with a generally horizontally extending outer surface, a paste hopper above the top run of the belt and having an orifice plate with an orifice slot therethrough and extending transversely of and overlying the top run of said belt, a paste delivery means in said hopper for feeding paste through said orifice slot at a predetermined rate, the bottom of the entire orifice plate being spaced throughout from and above the outer surface of the underlying portion of the top run of said belt so that there is a clearance therebetween which is at least slightly greater than the thickness of the grid to be pasted, a bottom portion of said orifice plate adjacent to and downstream of the orifice slot being spaced from and above the outer surface of the underlying portion of the top run of said belt so that there is a clearance therebetween only somewhat greater than the thickness of the grid to be pasted for controlling the thickness of the paste applied to the grid, a bottom portion of said orifice plate adjacent to and upstream of said orifice slot being spaced from and above the outer surface of an underlying portion of the top run of said belt such that there is a clearance therebetween greater than such clearance between said bottom portion downstream of said orifice slot and its associated underlying portion of the top run of said belt, and guide means constructed and arranged to guide a grid between said belt and said orifice plate at an angle inclined to the outer surface of at least the portion of the top run of said belt adjacent to and upstream of said orifice slot, such that as the grid passes beneath said orifice slot, the face of such grid adjacent said belt is slightly spaced from and above the outer surface of the immediately underlying portion of the top run of said belt to provide a clearnace therebetween so that paste being fed from said orifice slot passes through the grid and enters into such clearance, whereby both faces of the grid are covered with paste and the grid is overpasted.

32. A battery grid pasting machine as called for in claim 31 wherein said paste delivery means comprises a delivery roller in said hopper and means for varying the speed of said delivery roller relative to the speed of said belt.

33. A battery grid pasting machine comprising a frame, a conveyor mounted on said frame and having an endless metal belt with a generally horizontally extending rop run with an outer surface on which a battery grid is adapted to be supported and conveyed in one direction, a belt support roller on the underside of and supporting the top run of the belt, a paste hopper above the belt and having an orifice plate having an orifice slot therethrough which overlies and extends transversely across the belt, means in the hopper for feeding paste downwardly through said orifice slot at a predetermined rate, the entire bottom of the orifice plate being spaced throughout from and above the outer surface of the underlying portion of the top run of the belt to provide a clearance therebetween at least slightly greater than the thickness of the grid to be pasted, a bottom portion of said orifice plate adjacent to and downstream of the orifice slot being spaced from and above the underlying outer surface of the top run of the belt to provide a clearance greater than the thickness of the grid to be pasted for controlling the thickness of the paste applied to the grid, a bottom portion of said orifice plate upstream of and adjacent to said orifice slot being spaced from and above an underlying portion of the outer surface of the top run of the belt to provide a clearance therebetween greater that such clearance between said portion downstream of said orifice slot and said top run of said belt such that the grid can be inclined therein to the top run of the belt, guide means for guiding a grid into the clearance between said bottom portion of the orifice plate upstream of the orifice slot and the underlying outer surface of the belt at an inclinded angle to such outer surface of the top portion of the belt upstream of said orifice slot so there is clearance between the lower face of the grid and the underlying top portion of the belt into which paste is fed when the grid passes under the orifice slot so that paste is applied to both faces of the grid and the grid is overpasted, and means for raising and lowering said belt support roller to thereby vary the extent of said clearances, whereby the machine can be adjusted to vary the extend of the overpasting of the grids and to accommodate runs of grids of differing thickness.

34. A battery grid pasting machine as called for in claim 33 including a support for said belt support roller fixedly mounted on said frame and having an upwardly facing stop face thereon extending generally horizontally and accurately located relative to the uppermost surface portion of the belt support roller and means for accurately spacing the bottom face of the orifice plate above said stop face of the support for the belt support roller.

35. A battery grid pasting machine as called for in claim 34 wherein said accurate spacing means comprises a plurality of screws threaded upwardly into said orifice plate from the bottom face thereof, said screws having heads which are accurately machined to the same vertical dimension, said screws being threaded fully into said orifice plate and said heads being adapted to rest upon said stop face.

* * * * *